United States Patent
Broerman et al.

(10) Patent No.: US 7,533,162 B2
(45) Date of Patent: May 12, 2009

(54) METHOD, APPARATUS AND SYSTEM FOR SUPPORTING MULTIPLE COLLABORATIVE SESSIONS IN A BI-DIRECTIONAL COMMUNICATION DEVICE

(75) Inventors: Keith Robert Broerman, Carmel, IN (US); Linmei Shu, Austin, TX (US); Liangzhong Wang, Austin, TX (US)

(73) Assignee: Thomson Licensing, Boulogne-Billancourt (FR)

( * ) Notice: Subject to any disclaimer, the term of this patent is extended or adjusted under 35 U.S.C. 154(b) by 374 days.

(21) Appl. No.: 10/511,560

(22) PCT Filed: Apr. 10, 2003

(86) PCT No.: PCT/US03/11239

§ 371 (c)(1),
(2), (4) Date: Oct. 15, 2004

(87) PCT Pub. No.: WO03/090405

PCT Pub. Date: Oct. 30, 2003

(65) Prior Publication Data

US 2005/0198112 A1  Sep. 8, 2005

Related U.S. Application Data

(60) Provisional application No. 60/372,913, filed on Apr. 16, 2002.

(51) Int. Cl.
*G06F 15/177* (2006.01)
(52) U.S. Cl. .......... 709/220; 709/230; 709/227; 709/205; 709/245
(58) Field of Classification Search .......... 709/220, 709/230, 227, 205, 245
See application file for complete search history.

(56) References Cited

U.S. PATENT DOCUMENTS

| 5,668,943 | A | * | 9/1997 | Attanasio et al. ............... 714/7 |
| 6,141,341 | A | | 10/2000 | Jones et al. |
| 6,181,716 | B1 | | 1/2001 | Lide |
| 6,229,894 | B1 | | 5/2001 | Van Oorschot et al. |
| 6,233,235 | B1 | | 5/2001 | Burke et al. |
| 6,442,433 | B1 | | 8/2002 | Linberg |
| 6,529,740 | B1 | | 3/2003 | Ganucheau, Jr. et al. |
| 6,542,934 | B1 | * | 4/2003 | Bader et al. ................. 709/239 |

(Continued)

FOREIGN PATENT DOCUMENTS

JP  2000035929 A  2/2000

(Continued)

OTHER PUBLICATIONS

Burlacu Mihai, "Packet Cable Security Architecture", Helsinki Univ. of Technology, 2000, pp. 1-23.

(Continued)

*Primary Examiner*—Thanh Tammy Nguyen
(74) *Attorney, Agent, or Firm*—Robert D. Shedd; Paul P. Kiel; Guy H. Eriksen

(57) ABSTRACT

A method, apparatus and system for supporting multiple diagnostic sessions include receiving multiple diagnostic session requests, verifying identification information for each requester, establishing a communications channel for each verified requester, and communicating the requested information to all of the verified requesters via the established communications channels.

18 Claims, 2 Drawing Sheets

U.S. PATENT DOCUMENTS

| | | | |
|---|---|---|---|
| 6,604,141 B1 * | 8/2003 | Ventura | 709/227 |
| 6,606,661 B1 * | 8/2003 | Agrawal et al. | 709/227 |
| 6,711,621 B1 * | 3/2004 | Mitra et al. | 709/230 |
| 6,754,714 B1 * | 6/2004 | Chebrolu | 709/229 |
| 6,874,046 B1 * | 3/2005 | LeCrone et al. | 710/74 |
| 6,999,990 B1 * | 2/2006 | Sullivan et al. | 709/205 |
| 7,039,708 B1 * | 5/2006 | Knobl et al. | 709/227 |
| 2002/0049825 A1 * | 4/2002 | Jewett et al. | 709/215 |
| 2002/0112076 A1 * | 8/2002 | Rueda et al. | 709/245 |

FOREIGN PATENT DOCUMENTS

| | | |
|---|---|---|
| JP | 2001211106 A | 8/2001 |
| WO | WO0177826 | 10/2001 |

OTHER PUBLICATIONS

Dennis Bushmitch et al. "Supporting Video Transport on Docsis-Compliant Cable Networks", Panasonic Information and Neworking Technologies Laboratory, pp. 1-35.

Search Report Dated Jun. 20, 2003.

Hiromitsu.:"Let's Make xORB. How to house-brew your own ORB. 4. Comparison, Improvement and Comparison again", BIT (Tokyo), G0873A, vol. 30, No. 9, pp. 44-51, 1998.

* cited by examiner

METHOD, APPARATUS AND SYSTEM FOR SUPPORTING MULTIPLE COLLABORATIVE SESSIONS IN A BI-DIRECTIONAL COMMUNICATION DEVICE

CROSS-REFERENCE TO RELATED APPLICATIONS

This application claims the benefit, under 35 U.S.C. § 365 of International Application PCT/US03/11239, filed Apr. 10, 2003, which was published in accordance with PCT Article 21(2) on Oct. 30, 2003 in English and which claims the benefit of U.S. Provisional Application Ser. No. 60/372,913, filed Apr. 16, 2002, which is incorporated herein by reference in its entirety.

FIELD OF THE INVENTION

This invention relates to the field of bi-directional communication systems and, more specifically, to the simultaneous support of multiple sessions in a network device of a bidirectional communication system.

BACKGROUND OF THE INVENTION

A Telnet server makes the Internet Protocol (IP) address of a Telnet client accessible to applications by writing the IP address into device associated space initialized when the virtual device at the server is associated with the physical device at the client. Applications retrieve this device IP address using an application program interface, and are thus enabled to do job routing, printer pass-thru, access control and so forth using TCP/IP networks.

At the host end of the system, the Telnet server is coupled to the network via a transmission control protocol/internet protocol (TCP/IP) process, which provides information transport services; while at each Telnet client site a client is coupled to the network via a similar TCP/IP process. The Telnet server functions to note requests for specified services from Telnet clients and to service those requests. A plurality of application programs are provided at the host installation, and appropriate ones of these programs are selectively coupled to the Telnet server in response to Telnet client requests.

The procedure in which a point-to-point link is established and information is exchanged between a host application and a Telnet client application is termed a session, and a session typically commences by the generation of a service request by a Telnet client at a client workstation. In response to the receipt of a request for service, the Telnet server establishes a memory structure using host system memory for controlling the service procedure and for retrieving, storing and forwarding information pertaining to the request for service.

Typically, an authentication routine is initially called to determine whether the Telnet client requester is authorized to participate in the requested service, with the routine typically providing the client user ID and password at the client workstation which is then checked by the Telnet server at the host installation using an authentication application program routine. After the requester has been cleared by the authentication routine, the service requested is carried out in conjunction with the appropriate one or more application programs. Once the service is completed, the session is terminated.

Multiple Service Operators (MSO) often need to get operating information on networked devices, such as deployed cable modems and customer premises equipment, for testing, diagnosis, and troubleshooting. To facilitate diagnostic analysis and information transfer, many Media Terminal Adaptor (MTA) vendors have implemented Telnet servers on their products (e.g., Voice over IP enabled cable modems and other network devices). The MTA Telnet servers can provide run time and long-term operating information to requesters. A limitation of the Telnet servers, though, is that they currently only support one Telnet session at a time, which limits the diagnostic collaboration between multiple vendor parties.

SUMMARY OF THE INVENTION

The disadvantages heretofore associated with the prior art, are overcome by the present invention of a method and apparatus for supporting multiple Telnet sessions.

In one embodiment of the present invention a method includes receiving multiple Telnet session requests, verifying identification information for each requester, establishing a communications channel for each verified requester, and communicating the requested information to all of the verified requesters via the established communications channels.

BRIEF DESCRIPTION OF THE DRAWINGS

The principles of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

The present invention will be described within the context of a cable modem implementing Telnet server technology. However, it will be appreciated by those skilled in the relevant art that the present invention may also be implemented by various other network devices using communication sessions to diagnose, initialize, provision, and otherwise communicate with a network server. Thus, it is contemplated by the inventors that the present invention has broad applicability beyond the MTA described herein. In a preferred embodiment, the present invention advantageously provides a method and apparatus for a Telnet server supporting multiple sessions.

Figure 1:
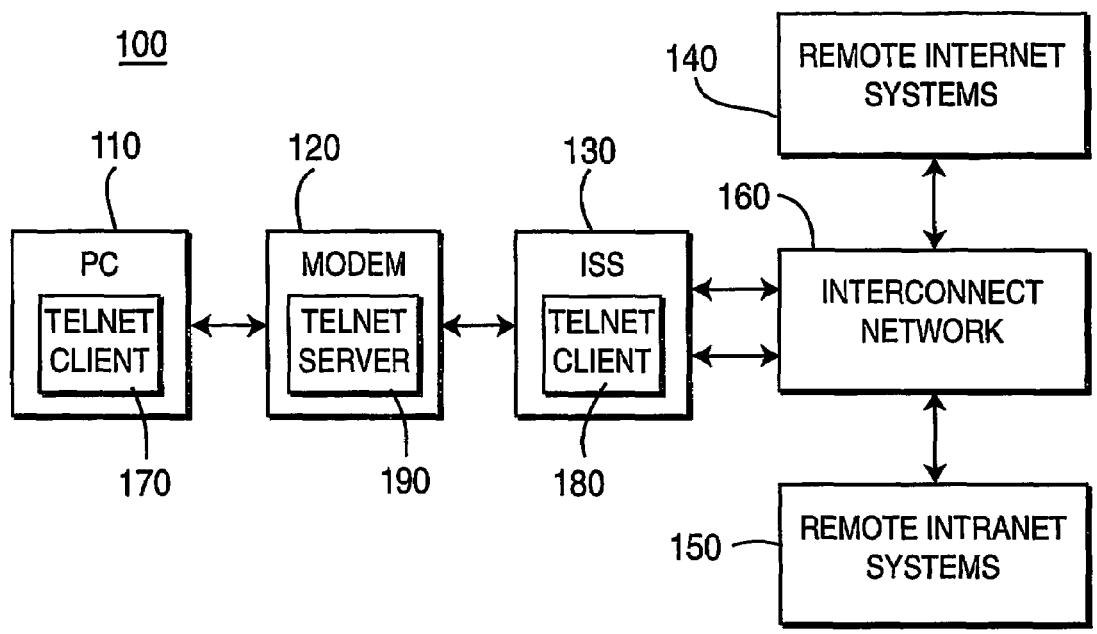
FIG. 1 depicts a high level block diagram of a communications network including an embodiment of the present invention.

FIG. 1 depicts a high level block diagram of a communications network including an embodiment of the present invention. The communications network 100 of FIG. 1 comprises a subscriber terminal (illustratively a personal computer (PC)) 110, which communicates with a modem 120, which communicates with a data service system (illustratively a Internet/Intranet service system (ISS)) 130, which communicates with remote Internet and Intranet systems 140, 150 via an interconnect network 160. The ISS 130 provides Internet or Intranet service to its subscriber sites (e.g., subscriber terminal 110) via the modem 120. Subscribers connect to the ISS 130 from their terminals (e.g., personal computers, Macintoshes, Web terminals and the like, typically including memory, processing and input/output functionality) via the interconnect network 160.

The ISS 130 comprises content servers (not shown) that store data for access from the subscriber terminals. The content servers support servers for Internet applications, such as electronic mail, bulletin boards, news groups, and World Wide Web access. In addition, the ISS 130 comprises web proxy servers (not shown) that allow a network administrator to restrict access to the remote Internet systems 140 or remote Intranet systems 150. Another use of the proxy servers is to cache frequently accessed data from the Internet. The ISS 130 also comprises address assignment servers (not shown). The address assignment servers assign an address to the subscriber terminal 110 when it is first connected to the ISS 130. The assigned address uniquely identifies the subscriber terminal 110 in the ISS 130.

The ISS 130 employs the Internet Protocol (IP) for data communication to and from various servers, as well as with the remote systems 140 and 150. The Transmission Control Protocol (TCP) operates above the IP layer and ensures reliable delivery of information to the content servers in the ISS 130 and the remote systems 140 and 150. The application protocols that operate above the TCP layer are specific to the applications being accessed by the subscriber terminal 110. For example, the File Transfer Protocol (FTP) is used for file transfers and the Hyper Text Transport Protocol (HTTP) is used for web accesses. Each of the remote Internet systems 140 and/or each of the remote Intranet systems 150 typically include the same or similar servers and modules as those described above for the ISS 130.

The communications network of FIG. 1 illustratively further includes a Telnet client 170 in the PC 110, a Telnet client 180 in the ISS 130 and a Telnet server 190 in the modem 120. One exemplary function of the Telnet server 190 within the modem 120 is to initiate a plurality of diagnostic tests to detect a fault within the network system and provide a requesting client(s) 170, 180 with run time and long-term operating information upon receiving a diagnostic request. The Telnet clients 170, 180 in the PC 110 and the ISS 130, respectively and the Telnet server 190 in the modem 120 operatively communicate according to the Telnet logon protocol.

Figure 2:
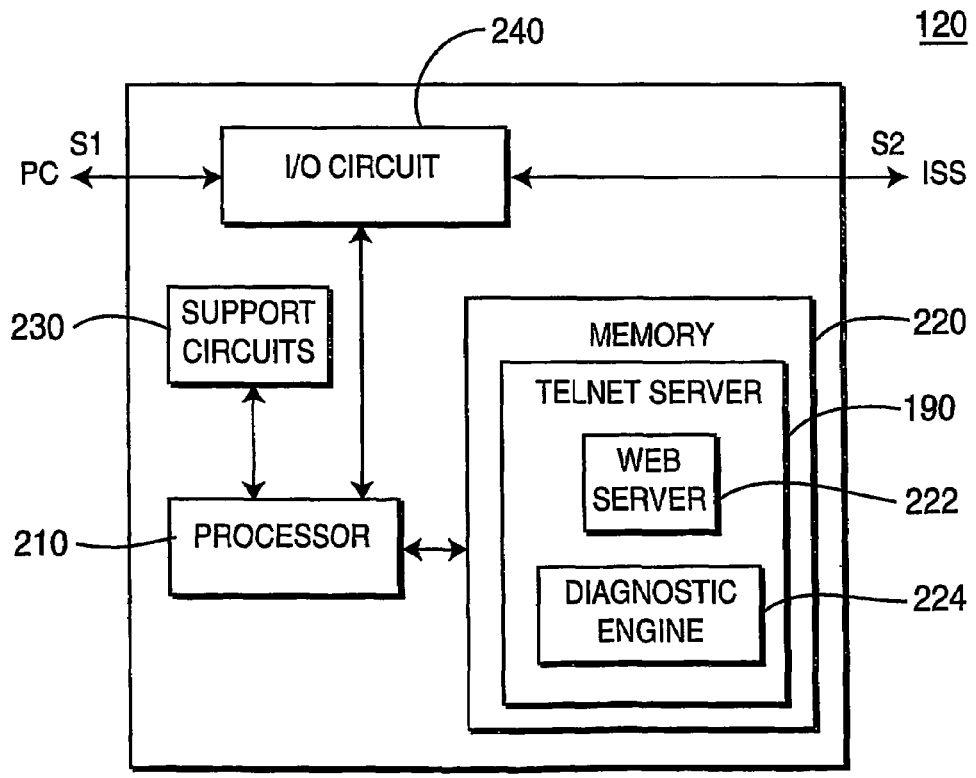
FIG. 2 depicts a high level block diagram of an embodiment of a modem of the present invention suitable for use in the network system of FIG. 1.

FIG. 2 depicts a high level block diagram of an exemplary embodiment of a modem 120 comprising a diagnostic Telnet server 170, in accordance with the principles of the present invention, suitable for use in the network system 100 of FIG. 1. The modem 120 of FIG. 2 comprises a processor 210 as well as a memory 220 for storing control programs and information. The memory 220 of the modem 120 further comprises the Telnet server 190 including a web server 222 and a diagnostic engine 224, the function of which are described below. The processor 210 cooperates with conventional support circuitry 230 such as power supplies, clock circuits, cache memory and the like as well as circuits that assist in executing the software routines stored in the memory 220. As such, it is contemplated that some of the process steps discussed herein as software processes may be implemented within hardware, for example, as circuitry that cooperates with the processor 210 to perform various steps. The modem 120 also contains input-output circuitry 240 that forms an interface between the various functional elements communicating with the modem 120. For example, in the embodiment of FIG. 1, the modem 120 communicates with the subscriber terminal 110 via a signal path S1 and with the ISS 130 via signal path S2.

Although the modem 120 of FIG. 2 is depicted as a general purpose computer that is programmed to perform various control functions in accordance with the present invention, the invention can be implemented in hardware, for example, as an application specified integrated circuit (ASIC). As such, the process steps described herein are intended to be broadly interpreted as being equivalently performed by software, hardware, or a combination thereof. Furthermore, although the Telnet server 190 of FIG. 2 is depicted as being located within the memory 220 of the modem 120, the Telnet server 190 may be located outside of the memory 220 of the modem 120, or may comprise a separate component in communication with the cable modem 120, in accordance with the principles of the present invention.

The web server 222 is implemented using known web server technologies. For example, in one embodiment, the web server 222 is implemented using the web server technology developed by Netscape Communications Corporation of Mountain View, Calif. In another embodiment, the web server 222 is implemented using the web server technology developed by Microsoft Corporation of Redmond, Wash.

Referring to FIG. 1, when a diagnostic request from the Telnet client 170 in the PC 110 or the Telnet client 180 in the ISS 130 is communicated to the Telnet server 190 in the modem 120, the web server 222 in the Telnet server 190 of the modem 120 decodes the diagnostic request. The web server 222 then parses and packages the data contained in the diagnostic request. That is, the web server 222 puts the decoded request in the proper data structure (e.g., the data structure specified by the Netscape Application Programming Interface from Netscape Communications Corp.). The processed request is then sent to the diagnostic engine 224 of the Telnet server 190 of the modem 120 via an intrahost communication socket. The intrahost communication socket is a communication protocol. In one embodiment, the intrahost socket is a UNIX domain socket. Alternatively, the socket may comprise other types of known sockets (e.g., INET socket). Thus, the web server 222 functions as a pass-through element that enables communication between the requesting device and the diagnostic engine 224.

The diagnostic engine 224 subsequently receives the processed data of the diagnostic request from the web server 222. The diagnostic engine 224 functions to interpret the data within the diagnostic request. The diagnostic engine 224 then invokes the test routines that are specified in the diagnostic request. In an alternate embodiment of the present invention, the diagnostic engine 224 can function intelligently to determine which tests are to be invoked based on the information contained in the diagnostic request and based on the history information of the ISS 130. The history information may include knowledge of previous troubleshooting experience and service topology information of the network system 100. The test routines performed by the diagnostic engine 224, when run, check various parts (including the servers and other components) of the clients 170, 180 in the PC 110 and the ISS 130, respectively, and the cable modem 120 itself, according to the Telnet protocol.

The diagnostic engine 224 receives the test results from the executed test routines and then correlates the test results to determine which components within the system are faulty or malfunctioning. The final test results are then sent to the requesting client for display via the web server 222.

The operation of the modem 120 will now be described in more detail. The modem of FIG. 1 and FIG. 2, in accordance with the principles of the present invention, is capable of supporting multiple Telnet sessions, wherein each task can be opened or closed independently. The operation of the modem 120 comprises two threads operating substantially concurrently. In one embodiment of the present invention, a Telnet authentication task in the modem 120 waits for a client to logon. When a new client attempts to connect, the authentication task requests for a user ID and a password required for the client to gain access to the modem 120. When the user ID and password are verified, the Telnet authentication task opens a socket and saves the session information, such as the client IP address and a listening port number. The authentication task then again waits for a new client to logon. The same authentication procedure is followed for each client attempting to logon to the modem 120. If the number of clients reaches a maximum allowable number of clients, determined by the number of available slots that can be provided by the modem 120, the authentication task will reject the next new client.

Operating contemporaneously with the Telnet authentication task is a Telnet sending task. The Telnet sending task waits for the modem 120 to generate the relevant information in response to a request from a client. The generated information is then sent to all of the active Telnet clients. If a specific send function fails (i.e., a send failure in a specific socket), the modem 120 assumes that the client is no longer active (disconnected), and the Telnet sending task will make available the particular client slot associated with the failed send command to the next client attempting to logon. The authentication task which manages the clients' logon procedure operates separate from the sending task. If a subsequent client attempts to log on while the Telnet server 190 is sending information to the current clients, the subsequent client is verified as described above and a request from the subsequent client is serviced individually in a subsequent sending task. The sending task will only send information to clients who were previously verified by the authentication task.

Figure 3:
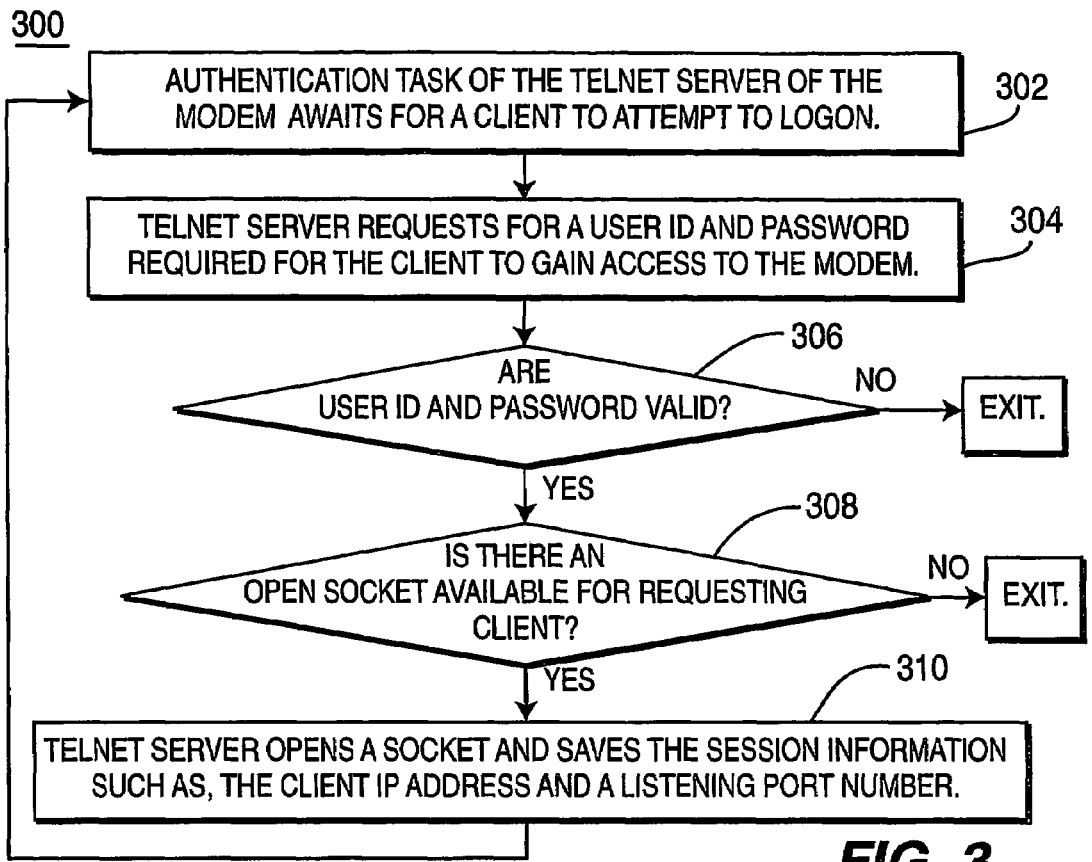
FIG. 3 depicts a flow diagram of an authentication method for providing multiple Telnet sessions simultaneously, in accordance with the principles of the present invention.

FIG. 3 depicts a flow diagram of an authentication method for providing multiple Telnet sessions, simultaneously in accordance with the principles of the present invention. The method 300 is entered at step 302 in which an authentication task of the Telnet server of the modem receives a request from a client to logon. The method 300 then proceeds to step 304.

At step 304, the method 300 requests for a user ID and a password required for the client to gain access to the modem. The method 300 then proceeds to step 306.

At step 306, the method 300 determines if the user ID and password are valid. If the user ID and password are valid, the method 300 proceeds to step 308. If the user ID and password are not valid, the method 300 rejects the client's attempt to logon and the method 300 is exited.

At step 308, the method 300 determines if there is an open socket available for the requesting client. If there is a socket available for the requesting client, the method 300 proceeds to step 310. If a socket is not available for the requesting client, the method 300 rejects the client request and the method 300 is exited.

At step 310, the method 300 saves the session information such as, the client IP address and the client receiving port number. The method 300 then returns to step 302 to wait for a next Telnet client to log on.

Figure 4:
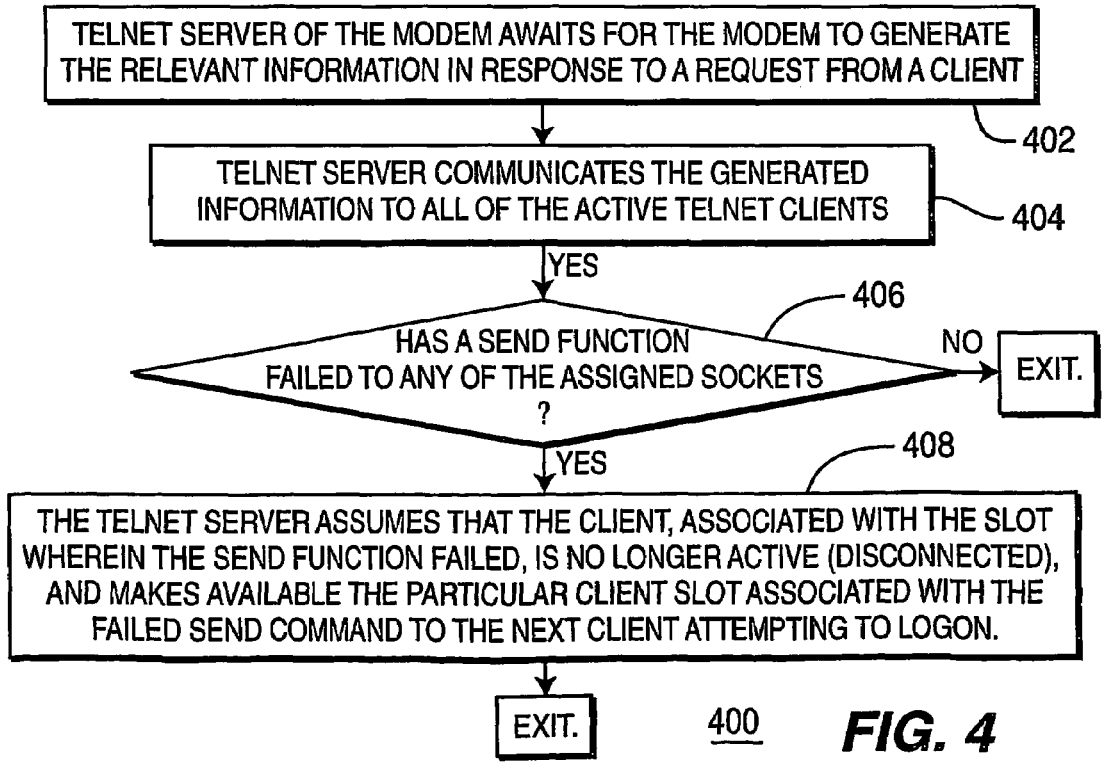
FIG. 4 depicts a flow diagram of a sending method for providing multiple Telnet sessions simultaneously, in accordance with the principles of the present invention.

FIG. 4 depicts a flow diagram of a sending method for providing multiple Telnet sessions simultaneously in accordance with the principles of the present invention. The sending method 400 operates substantially concurrently with the authentication method 300. The method 400 is entered at step 402 in which a sending task of the Telnet server of the modem awaits for the modem to generate the relevant information to be sent to the clients logged on. The method 400 then proceeds to step 404.

At step 404, the method 400 then communicates the generated information to each of the active Telnet clients via a socket with the client destination IP address and receiving port number which were saved in step 310. The method 400 then proceeds to step 406.

At step 406, the method 400 determines if a send function failed to any of the Telnet clients. If a send function failed, the method 400 proceeds to step 408. If there were no send function failures, the method 400 returns to step 402.

At step 408, the method 400 assumes that the client, associated with the slot wherein the send function failed, is no longer active (disconnected), and the sending task will make available the particular client slot associated with the failed send command to the next client attempting to logon. The method 400 then returns to step 402.

While the forgoing is directed to some embodiments of the present invention, other and further embodiments of the invention may be devised without departing from the basic scope thereof. As such, the appropriate scope of the invention is to be determined according to the claims, which follow.

The invention claimed is:

1. A method for supporting multiple diagnostic sessions in a bi-directional communication device, said method comprising:
  receiving diagnostic session requests from a plurality of requesters;
  verifying identification information for each of said requesters;
  establishing a communications channel for each verified requester; and
  communicating diagnostic information corresponding to a particular one of the diagnostic session requests received from a particular one of said verified requesters to all of said verified requesters via said established communications channels,
  wherein said establishing a communications channel further comprises saving session information such as, a requester IP address and a requester receiving port number for each of said verified requesters, and
  wherein the requested information is communicated to each of said verified requesters via an available socket comprising the respective saved session information.

2. The method of claim 1, further comprising:
  if communication of information to a requester fails, making available, to a subsequent requester, the communications channel associated with the failed communication.

3. The method of claim 1, wherein said identification information comprises a user ID and a password.

4. The method of claim 1, wherein said establishing a communications channel comprises assigning an available socket for communication with each verified requester.

5. The method of claim 4, further comprising rejecting subsequent requests after a total number of available sockets has been assigned.

6. An apparatus for supporting multiple diagnostic sessions in a bi-directional communication device, said apparatus comprising:
  a server;
  a memory for storing program instructions; and
  a processor for executing said instructions to configure the apparatus to perform the steps of:
    receiving diagnostic session requests from a plurality of requesters;
    verifying identification information for each of said requesters;

establishing a communications channel for each verified requester; and communicating diagnostic information corresponding to a particular one of the diagnostic session requests received from a particular one of said verified requesters to all of said verified requesters via said established communications channels, wherein said establishing a communications channel further comprises saving session information such as, a requester IP address and a requester receiving port number for each of said verified requesters, and wherein the requested information is communicated to each of said verified requesters via an available socket comprising the respective saved session information.

7. The apparatus of claim 6, further configured to perform the step of:

if communication of information to a requester fails, making available, to a subsequent requester, the communications channel associated with the failed communication.

8. The apparatus of claim 6, further configured to perform the steps of:

rejecting subsequent requests after a total number of available sockets has been assigned.

9. The apparatus of claim 6, wherein said establishing a communications channel comprises assigning an available socket for communication with each verified requester.

10. The apparatus of claim 9, wherein said assigned sockets comprise a requester IP address and a requester receiving port number.

11. The apparatus of claim 6, wherein said plurality of requesters comprise Telnet clients.

12. The apparatus of claim 6, wherein said plurality of requesters are network devices.

13. The apparatus of claim 6, wherein said server comprises:

a web server for enabling communication between a requesting device and a diagnostic engine; and said diagnostic engine for performing the routines that are specified in each of said requests.

14. The apparatus of claim 6, wherein said apparatus comprises a modem.

15. An apparatus for supporting multiple Telnet sessions, comprising:

means for receiving Telnet session requests from a plurality of requesters;

means for verifying identification information for each of said requesters;

means for establishing a communications channel for each verified requester; and means for communicating diagnostic information corresponding to a particular one of the diagnostic session requests received from a particular one of said verified requesters to all of said verified requesters via said established communications channels, wherein said establishing a communications channel further comprises saving session information such as, a requester IP address and a requester receiving port number for each of said verified requesters, and wherein the requested information is communicated to each of said verified requesters via an available socket comprising the respective saved session information.

16. Computer-readable medium for storing a set of instructions, wherein when said set of instructions is executed by a processor perform a method comprising:

receiving Telnet session requests from a plurality of requesters;

verifying identification information for each of said requesters;

establishing a communications channel for each verified requester; and communicating diagnostic information corresponding to a particular one of the diagnostic session requests received from a particular one of said verified requesters to all of said verified requesters via said established communications channels, wherein said establishing a communications channel further comprises saving session information such as, a requester IP address and a requester receiving port number for each of said verified requesters, and wherein the requested information is communicated to each of said verified requesters via an available socket comprising the respective saved session information.

17. A network comprising:

at least one subscriber terminal comprising a Telnet client for initiating Telnet session requests;

at least one data servicing system comprising a Telnet client for initiating Telnet session requests; and a network device comprising:

a Telnet server;

a memory for storing program instructions; and a processor for executing said instructions to configure said network device to perform the steps of:

receiving Telnet session requests from said at least one subscriber terminal and said at least one data servicing system;

verifying identification information for each of said requesters;

establishing a communications channel for each verified requester; and communicating diagnostic information corresponding to a particular one of the diagnostic session requests received from a particular one of said verified requesters to all of said verified requesters via said established communications channels, wherein said establishing a communications channel further comprises saving session information such as, a requester IP address and a requester receiving port number for each of said verified requesters, and wherein the requested information is communicated to each of said verified requesters via an available socket comprising the respective saved session information.

18. The network of claim 17, wherein said network device is further configured to perform the step of:

if communication of information to a requester fails, making available, to a subsequent requester, the communications channel associated with the failed communication.

* * * * *